(12) United States Patent
Iwasaki et al.

(10) Patent No.: US 7,147,916 B2
(45) Date of Patent: Dec. 12, 2006

(54) MAGNETIC MATERIAL, METHOD FOR PRODUCING THE SAME, AND MAGNETIC RECORDING MEDIUM

(75) Inventors: Yoh Iwasaki, Miyagi (JP); Yuichi Sasaki, Miyagi (JP); Mikihisa Mizuno, Miyagi (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 10/230,625

(22) Filed: Aug. 29, 2002

(65) Prior Publication Data

US 2003/0068530 A1 Apr. 10, 2003

(30) Foreign Application Priority Data

Sep. 3, 2001 (JP) .............................. 2001-265938

(51) Int. Cl.
*G11B 5/66* (2006.01)
(52) U.S. Cl. .................................... 428/403; 428/842.4
(58) Field of Classification Search ................ 428/403, 428/694 T, 900, 694 IS, 694 R, 402, 842.3, 428/842.4
See application file for complete search history.

(56) References Cited

U.S. PATENT DOCUMENTS

| | | | | |
|---|---|---|---|---|
| 4,244,932 A | * | 1/1981 | Basile et al. | 423/274 |
| 6,534,205 B1 | * | 3/2003 | Sato et al. | 428/826 |
| 6,830,824 B1 | * | 12/2004 | Kikitsu et al. | 428/828.1 |

OTHER PUBLICATIONS

Peng et al., "Magnetic properties of monodispersed Co/CoO clusters", Jan. 2000, Phys. Rev. B, vol. 61, No. 4, pp. 3103-3109.*

* cited by examiner

*Primary Examiner*—Holly Rickman
(74) *Attorney, Agent, or Firm*—Robert J. Depke; Rockey, Depke, Lyons & Kitzinger LLC

(57) ABSTRACT

A magnetic material having a structure of a material having a ferromagnetic phase at ordinary temperature as a core and a material having an antiferromagnetic phase at ordinary temperature surrounding the periphery of the core in the form of a shell, wherein a ratio between a volume of the ferromagnetic phase material and the volume of the antiferromagnetic phase material in the magnetic material is in a range where no exchange biasing field of the magnetic material appears and a rotational hysteresis loss of the magnetic material is made the maximum, a method of producing the same, and a magnetic recording medium using the same.

8 Claims, 14 Drawing Sheets

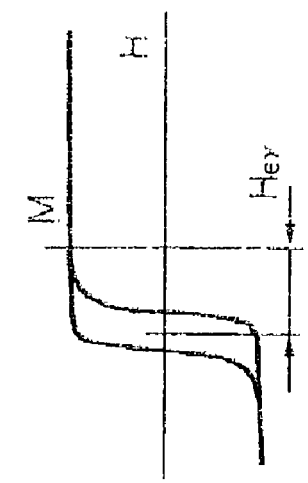
FIG.6A  $t_{AF} = 5(nm)$
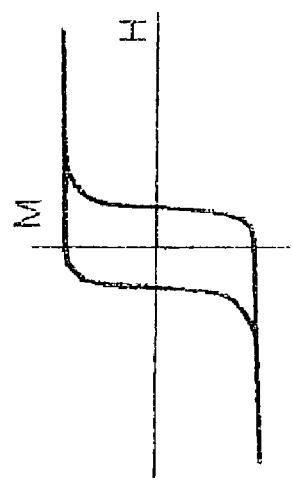
FIG.6B  $t_{AF} = 10(nm)$
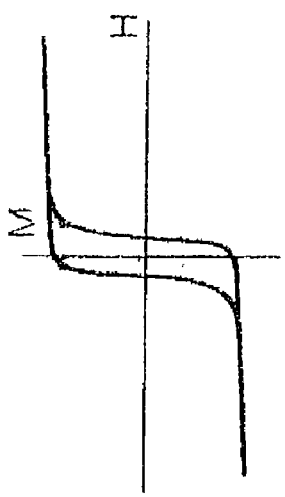
FIG.6C  $t_{AF} = 20(nm)$  $H_{ex}$

MAGNETIC MATERIAL, METHOD FOR PRODUCING THE SAME, AND MAGNETIC RECORDING MEDIUM

This application claims priority to Japanese Patent Application Number JP2001-265938 filed Sep. 3, 2001, which is incorporated herein by reference.

BACKGROUND OF THE INVENTION

1. Field of the Invention

The present invention relates to a magnetic material formed by magnetically coupling a ferromagnetic material and an antiferromagnetic material, a method of producing the same, and a magnetic recording medium using the magnetic material.

2. Description of the Related Art

As magnetic recording media, magnetic tape formed by coating magnetic particles on a substrate, floppy discs, and magnetic disc devices enabling random access as external storage devices of computers, that is, so-called "hard discs", are being widely used.

A magnetic disc is comprised of a substrate formed on one surface with a layer-like recording medium comprised of a magnetic material. Fine magnetic particles are filled in the thin film recording medium uniformly at a high density and in a good dispersion state. A magnetic head moving above the recording medium along a predetermined track magnetizes a group of fine magnetic particles of the magnetic material corresponding to one bit or determines a magnetization state of the group of magnetic particles to record or reproduce one bit of data.

One of the methods for raising the recording density of a magnetic disc device is reducing the thickness of the recording medium and increasing the fineness of the magnetic particles of the magnetic material forming the recording medium.

When magnetic particles of a magnetic material are increased in fineness, however, the effect of so-called "thermal fluctuaction" appears. If the effect of the thermal fluctuaction exerted upon the magnetization becomes large, the direction of the recorded magnetization of the fine magnetic particles is reversed by the surrounding thermal energy and the direction of the magnetization lost, or the residual magnetization or reproduction output declines along with the elapse of time. Due to this, the magnetic recording medium gradually becomes unable to stably maintain a recorded state over a long time.

The stability of a magnetic particle against the thermal fluctuaction may be expressed by $$K_u V/kT$$

where, $K_u$ is the magnetic anisotropy energy per volume of a magnetic particle, V is the volume of a magnetic particle, k is the Boltzmann constant, and T is the absolute temperature.

The smaller the value of $K_u V/kT$, the larger the influence of the thermal fluctuaction. The higher the recording density, the smaller the volume V of a magnetic particle, so the smaller the $K_u V/kT$ and the weaker the resistance to the thermal fluctuaction.

The smaller the volume V of a magnetic particle, the smaller the magnetic anisotropy energy of the magnetic particle and the shallower the potential energy barrier for stabilizing the magnetization direction, so the magnetization vector of the magnetic particles easily escapes from that potential energy barrier even due to the energy of the thermal fluctuaction and the magnetization state becomes unstable.

The magnetic field necessary for changing the magnetization direction of a magnetized magnetic particle is referred to as the "coercive force". If the coercive force of the magnetic recording medium is low, the magnetization state of the magnetic particles will change and become unstable even by a small external effect such as the thermal fluctuaction. Conversely, if the coercive force is high, the magnetization state will be difficult to change by the thermal fluctuaction, so resistance to the thermal fluctuaction will be strong and the stability of the recorded state can be secured.

Accordingly, in order to achieve high density recording, it is necessary to increase the magnetic anisotropy energy of the magnetic particles, and consequently raise the coercive force of the magnetic material and overcome the influence of the thermal fluctuaction.

Further, the magnetic material forming the magnetic recording medium is being required to be more excellent in corrosion resistance, smoothness, abrasion resistance, the ability to secure a low process temperature, and various other characteristics relating to ease of production and convenience in usage. However, it is not easy to simultaneously satisfy the requirements of magnetic anisotropy energy, coercive force, and the above characteristics.

One method being experimented with to increase the magnetic anisotrophy energy of a magnetic material to raise the coercive force is the method of utilizing magnetic coupling of a ferromagnetic material and an antiferromagnetic material. Such a magnetic material is attracting attention as a magnetic material able to provide a large magnetic anisotrophy energy and a high coercive force while largely reducing the thickness of the ferromagnetic thin film.

For example, the thin film-shaped magnetic material disclosed in Japanese Unexamined Patent Publication (Kokai) No. 11-296832 utilizes magnetic coupling of a ferromagnetic material and antiferromagnetic material to raise the magnetic anisotrophy energy and the coercive force while sufficiently satisfying the reduction of the thickness of the recording medium and is therefore suitable for a high recording density.

FIG. 1 shows the configuration of a magnetic recording medium using such a thin film-shaped magnetic material.

The magnetic recording medium shown in FIG. 1 is comprised of a substrate 101 on one surface of which an antiferromagnetic layer 102 and a ferromagnetic recording layer 103 are stacked. The antiferromagnetic layer 102 acts as an underlying layer of the ferromagnetic recording layer 103. A nonmagnetic underlying layer or the like may also be formed between the substrate 101 and the antiferromagnetic layer 102.

Such a foil-like magnetic recording medium has a high anisotrophy energy and coercive force, so is suitable for reduction of thickness of the recording medium and a high recording density.

Turning now to the problem to be solved by the invention, to deal with future advances in magnetic recording devices, magnetic materials and magnetic recording media having more excellent properties are being demanded.

A magnetic fine particle having an antiferromagnetic phase and a ferromagnetic phase is one leading candidate. Such a magnetic fine particle would enable further fineness of the magnetic material, would enable a good dispersion state of the magnetic material to be secured, and could be expected to overcome the problem of the thermal fluctuation and raise the coercive force.

The magnetic characteristics of a magnetic particle having an antiferromagnetic phase and a ferromagnetic phase, for example, a ferromagnetic particle having an antiferromagnetic shell, have been reported in W. H. Meiklejohn and C. P. Bean, Phys. Rev., vol. 102 (1956) 1413 and Phys. Rev., vol. 105 (1957) 904.

However, the phenomena reported there were observed in the case of cooling to a low temperature of 77 K, so the Co particles with CoO shells used there are not suitable for use for a magnetic recording medium at room temperature. Also, the reports dealt with "asymmetry of magnetization hysteresis curves" as the effect of the antiferromagnetic shell and not an increase of the coercive force important for magnetic recording.

As the material of fine magnetic particles having a sufficient coercive force, needle-like fine iron particles and barium ferrite fine particles having been considered to be candidates.

Iron-based metal particles, however, increase in surface area along with increased fineness and suffer from a severe problem of corrosion. Also, a barium ferrite fine particle has a plate-like shape, so they solidify by superposing the fine particles, therefore, no method has been established for realizing a good dispersion state for coating as a medium.

SUMMARY OF THE INVENTION

A first object of the present invention is to provide an increased fineness magnetic material having a ferromagnetic phase and an antiferromagnetic phase suppressing the thermal fluctuaction, further raising the magnetic anisotrophy energy and coercive force, excellent in corrosion resistance and thermal stability, having a good dispersion state, and able to cope with further higher density recording while sufficiently satisfying the requirements of a reduction of thickness of the magnetic recording medium and increased fineness of the magnetic particles, and a method for producing the same.

A second object of the present invention is to provide a magnetic recording medium comprised of such an increased fineness magnetic material.

To attain the first object, according to a first aspect of the present invention, there is provided a magnetic material comprising a core formed by a material having a ferromagnetic phase at ordinary temperature and a shell formed by surrounding a periphery of the core by a material having an antiferromagnetic phase at ordinary temperature.

Preferably, a ratio between a volume of the ferromagnetic phase material and a volume of the antiferromagnetic phase material is in a range where no exchange biasing field appears in the magnetic material and a rotational hysteresis loss becomes maximum.

To attain the above first object, according to a second aspect of the present invention, there is provided a method for producing a magnetic material having a core formed by a material having a ferromagnetic phase at ordinary temperature and having a shell formed by coating a periphery of the core by a material having an antiferromagnetic phase at ordinary temperature, comprising the steps of forming the ferromagnetic core from a predetermined ferromagnetic material, surrounding the ferromagnetic core by a predetermined material for forming the antiferromagnetic shell, and causing a reaction in an outer periphery of the predetermined material for forming the antiferromagnetic shell in a predetermined atmosphere to form the antiferromagnetic shell.

Preferably, in the step of forming the ferromagnetic core, the method comprises heating the predetermined ferromagnetic material for forming the ferromagnetic core and cooling the heated ferromagnetic material to increase a component of a hexagonal closest-packed structure in the crystal structure of the ferromagnetic material.

To attain the above first object, according to a third aspect of the present invention, there is provided a magnetic material formed by aggregates each having a plurality of antiferromagnetic phases formed at ordinary temperature and a plurality of ferromagnetic phases formed at ordinary temperature and magnetically coupled with the antiferromagnetic phases or by composite particles each including a plurality of the aggregates.

To attain the above second object, according to a fourth aspect of the present invention, there is provided a magnetic recording medium having a substrate and a magnetic layer arranged on the substrate, wherein the magnetic layer includes a plurality of magnetic units each having a core formed by a material having a ferromagnetic phase at ordinary temperature and a shell formed by coating the periphery of the core by a material having an antiferromagnetic phase at ordinary temperature.

To attain the above second object, according to a fifth aspect of the present invention, there is provided a magnetic recording medium having a substrate and a magnetic layer arranged on the substrate, wherein the magnetic layer includes a plurality of magnetic units each formed from aggregates each having a plurality of antiferromagnetic phases formed at ordinary temperature and a plurality of ferromagnetic phases formed at ordinary temperature magnetically coupled with the antiferromagnetic phases, or by composite particles each including a plurality of the aggregates.

According to the present invention, the magnetic material includes a magnetic particle comprising a ferromagnetic phase core and an antiferromagnetic phase shell. In a magnetic particle having a ferromagnetic phase and antiferromagnetic phase, the magnetizations of magnetic elements in the magnetic particle can be easily aligned, the volume of the ferromagnetic phase relatively increases due to the antiferromagnetic shell, and the antiferromagnetic shell has the effect of maintaining the magnetic order of the ferromagnetic phase. Therefore, even if small in particle size, the particle holds a high coercive force and is strong against the thermal fluctuaction.

The strength of the magnetic coupling of the ferromagnetic phase core and the antiferromagnetic phase shell is dependennt upon the ratio of volume between the ferromagnetic core and antiferromagnetic shell. In the present invention, preferably the value of the ratio of volume is in a range where no exchange biasing field appears and the rotational hysteresis loss becomes maximum in the magnetic particle.

BRIEF DESCRIPTION OF THE DRAWINGS

These and other objects and features of the present invention will become clearer from the following description of the preferred embodiments given with reference to the attached drawings, wherein:

FIGS. 6A to 6C are views showing magnetization curves in a case where the thickness of the antiferromagnetic shell in the magnetic material shown in FIG. 2 is changed;

DESCRIPTION OF THE PREFERRED EMBODIMENTS

Below, preferred embodiments of the magnetic material of the present invention, the method for producing the same, and a magnetic recording medium using the same will be explained with reference to the attached drawings.

First Embodiment

Figure 1:
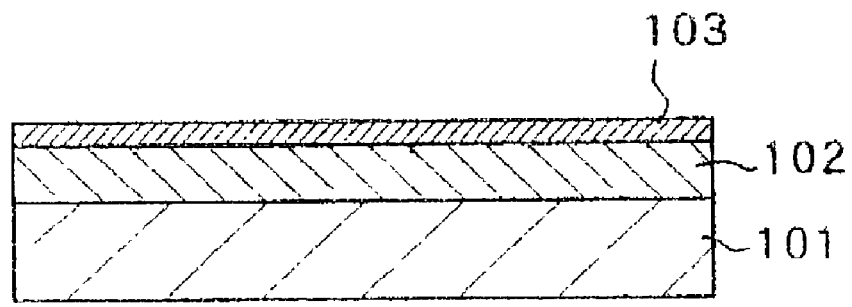
FIG. 1 is a sectional view of a thin film-shaped recording medium of the related art utilizing magnetic coupling between a ferromagnetic material and an antiferromagnetic material.
Figure 2:
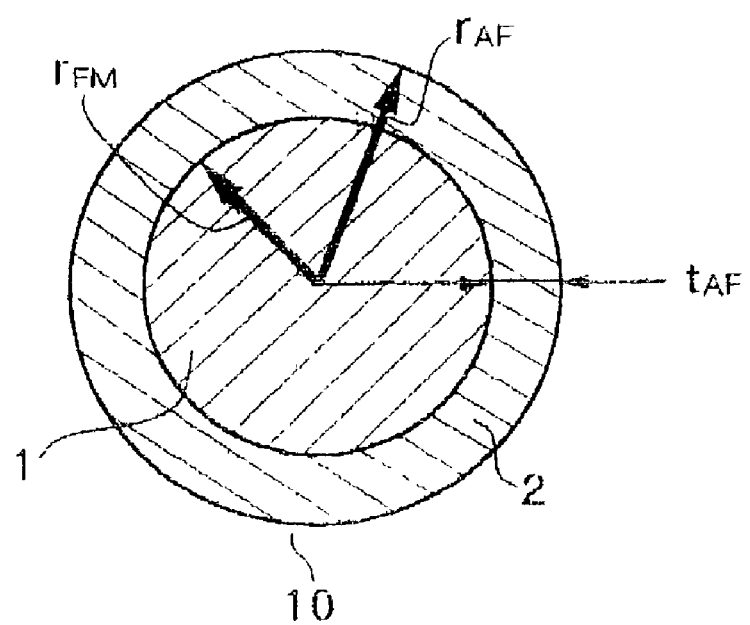
FIG. 2 is a sectional view of a magnetic material comprised of a coexisting ferromagnetic phase and antiferromagnetic phase according to a first embodiment of the present invention.

FIG. 2 shows a magnetic material comprised of a coexisting ferromagnetic phase and antiferromagnetic phase of the present embodiment, that is, a magnetic particle 10. The magnetic particle 10 has a so-called spherical core-shell structure comprised of a ferromagnetic phase 1 forming a schematically spherical core and an antiferromagnetic phase 2 surrounding it in the form of a shell.

A ferromagnetic material having a "ferromagnetic phase" means a material exhibiting a net magnetization able to interact with an external magnetic field. In this sense, it does not mean just a ferromagnetic material in the strict sense, but includes also a ferrimagnetic material such as spinel ferrite.

In a recording medium including a plurality of magnetic particles 10 having such a core-shell structure, even if two or more magnetic particles contact each other, since the ferromagnetic phases 1 are isolated by the shells of the antiferromagnetic phases so that they will not directly touch each other, the energy for gathering together of a plurality of particles by magnetic force to form secondary particles is small. Accordingly, it is easy to obtain a magnetic powder coating film with a good dispersion state of magnetic particles.

By providing a coexisting ferromagnetic phase 1 and antiferromagnetic phase 2 in each magnetic particle 10, a high coercive force can be maintained even with increased fineness of the magnetic particles 10 due to the magnetic coupling of the ferromagnetic phase 1 and the antiferromagnetic phase 2.

In the case of a recording medium of a ferromagnetic material alone, the case of a thin film magnetic recording medium utilizing the magnetic coupling of a ferromagnetic material and antiferromagnetic material, or the case of a large magnetic particle having a ferromagnetic phase and an antiferromagnetic phase, the magnetic material exhibits a spatial distribution of the magnetization of magnetic elements and the magnetizations are not all aligned, so the coercive force ends up being lost by that amount.

Contrary to this, in the case of a small magnetic material having a ferromagnetic phase and an antiferromagnetic phase, the magnetizations of the magnetic elements in the ferromagnetic material 1 can be easily aligned due to the magnetic coupling of the ferromagnetic phase 1 and the antiferromagnetic phase 2, the volume of the ferromagnetic material 1 relatively increases due to the antiferromagnetic material shell 2, and the antiferromagnetic material shell 2 maintains the internal magnetic order of the ferromagnetic material 1, so even with a small particle size, a high coercive force can be held and resistance to the thermal fluctuaction is strong.

The reason why the coercive force can be raised in the magnetic particle 10 will be explained in more detail by using FIGS. 3A to 3C.

Figure 3A:
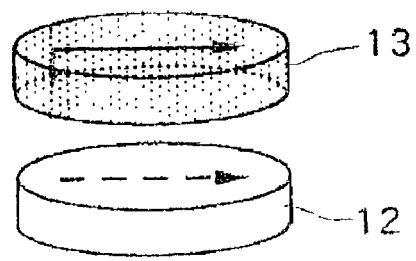
FIGS. 3A to 3C are views for explaining the enhancement of the magnetic anisotrophy energy and coercive force caused by magnetic coupling of a ferromagnetic material and an antiferromagnetic material in a magnetic material comprised of a coexisting ferromagnetic phase and the antiferromagnetic phase according to the first embodiment of the present invention.
Figure 3B:
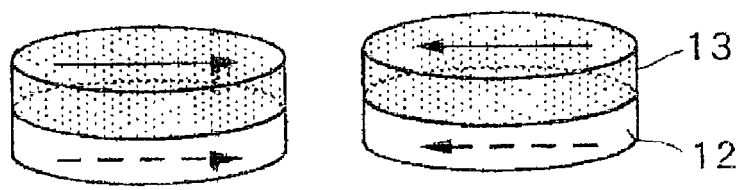
Figure 3C:
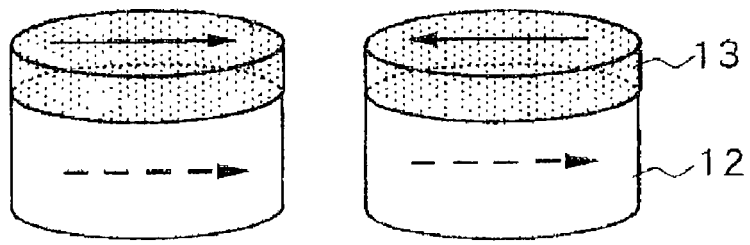

FIGS. 3A to 3C show disc-like magnetic elements magnetized by a magnetic head. Reference numeral 13 shows a ferromagnetic element forming the ferromagnetic phase core 1, reference numeral 12 shows an antiferromagnetic element forming the antiferromagnetic phase shell 2, and the arrows show the direction of magnetization.

An antiferromagnetic material has a regular arrangement of spin in its crystal lattice. For example, rightward spins and leftward spins alternately occupy the lattice points. In the crystal as a whole, the sum of the magnetic moments of the spins becomes zero. Taking note of just one group of spins aligned in the same direction, the broken arrows shown in the antiferromagnetic elements 12 in FIGS. 3A to 3C show the magnetic moments (sub-lattice magnetizations) of such a group of spins.

Also, in FIGS. 3A to 3C, the ferromagnetic element 13 and the antiferromagnetic element 12 are single domains and are oriented in magnetization to either the left or right. Due to the magnetic field of the magnetic head, the magnetization direction of the ferromagnetic element 13 is reversed and thus magnetic recording is achieved.

Figure 4A:
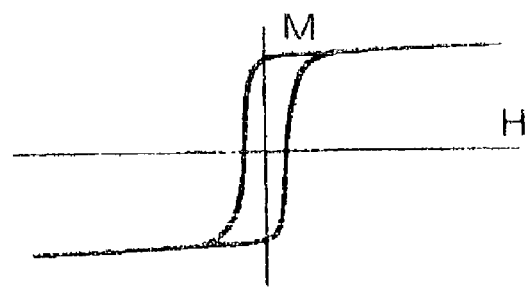
FIGS. 4A to 4C are views showing magnetization curves of the magnetic materials shown in FIG. 3.
Figure 4B:
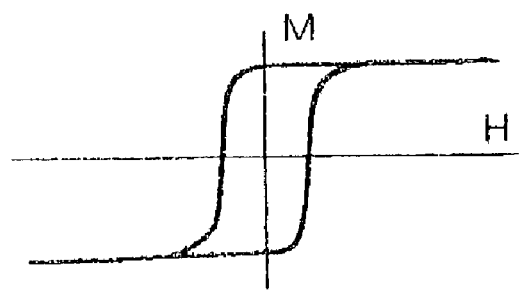
Figure 4C:
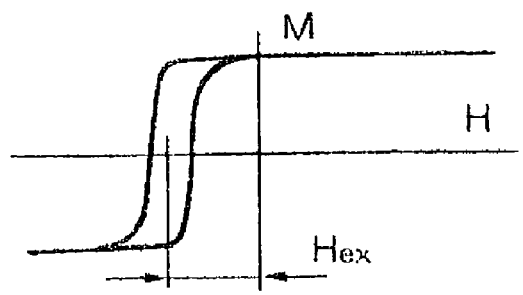

FIGS. 4A to 4C show magnetization curves of the magnetic elements shown in FIGS. 3A to 3C. In FIGS. 4A to 4C, the abscissas indicate the external magnetic fields, and the ordinates indicate the measured magnetizations.

As explained above, the antiferromagnetic element 12 has an overall magnetic moment of zero and does not receive any torque from the external magnetic field, so in the measurement of the magnetization curve of the magnetic material element comprised of the ferromagnetic element 12 and the antiferromagnetic element 13, the magnetization observed is that of the ferromagnetic element 13 only.

As shown in FIG. 3B, when the antiferromagnetic element 12 and the ferromagnetic element 13 contact each other, an exchange interaction acts between spins at the interface of the two elements, and the magnetic coupling effect arises that aligns magnetization of the ferromagnetic element 13 and sub-lattice magnetization of the antiferromagnetic element 13 in parallel (or, anti-parallel depending on the material) to each other. The strength of the magnetic coupling is determined by the structure of the interface.

For this reason, when the magnetization direction of the ferromagnetic element 13 is changed by the external magnetic field, the magnetization of the sub-lattice in the antiferromagnetic element 12 tries to change orientation together. FIG. 3B expresses this mode of magnetization reversal by changing the orientations of the magnetization vector (solid arrow) of the ferromagnetic element 13 and the sub-lattice magnetization (broken arrow) of the antiferromagnetic element 12 while leaving them aligned in the same direction as each other.

As shown in FIG. 3B, in a magnetic material element where the magnetization of the ferromagnetic element 13 and the sub-lattice magnetization of the antiferromagnetic element 12 change in orientation while being aligned by the exchanging coupling at the interface, there is an effect of increase of the coercive force.

The height of the potential energy barrier which must be overcome in order to change the orientation of the magnetization is given by the sum of the anisotrophy energy of the ferromagnetic element 13 and the anisotrophy energy of the antiferromagnetic element 12 of this magnetic material element. Particularly, if the axes of easy magnetization of the two coincide, it is clear that the potential energy barrier becomes higher by taking the sum of the same.

On the other hand, the torque applied by the external magnetic field so that the magnetization rotates is proportional to the product of a saturation magnetization M of the ferromagnetic element 13, a volume V of the ferromagnetic element 13, and the strength of the magnetic field H. In order to produce the magnetization reversal, this torque must exceed the above slope of the potential energy.

Namely, when the ferromagnetic element 13 is coupled with the antiferromagnetic element 12, in order to produce the magnetization reversal, the amount of increase of the torque acting upon the ferromagnetic element 13 must be larger than the amount of increase of the potential energy and therefore greater magnetic field H becomes necessary.

FIG. 3A shows a magnetic material element comprised of an antiferromagnetic element 12 and a ferromagnetic element 13 which is not coupled with but is isolated from the antiferromagnetic element 12. The magnetization curve thereof is shown in FIG. 4A.

FIG. 3B shows a magnetic material element where the ferromagnetic element 13 is coupled with the antiferromagnetic element 12. The magnetization curve thereof is shown in FIG. 4B.

In the magnetization curves shown in FIGS. 4A to 4C, the value of the magnetic field H necessary for producing the magnetization reversal is the magnetic field where magnetization curve cuts across the abscissa.

Accordingly, as shown in FIGS. 4A to 4C, when the ferromagnetic element 13 is coupled with the antiferromagnetic element 12 (FIG. 4B), the magnetic field necessary for the magnetization reversal increases and the coercive force (magnetic field corresponding to distance between two positions where the magnetization curve cuts across the abscissa) increases from the case where the ferromagnetic element 13 and the antiferromagnetic element 12 are not coupled (FIG. 4A).

The strength of the exchange coupling at the interface of the ferromagnetic element 13 and the antiferromagnetic element 12 is determined just by the structure of the interface, so does not change and maintains a constant strength even if the volume of the parts away from the interface increases or decreases. It is seen from this how the magnetization curve of the ferromagnetic element 13 coupled with the antiferromagnetic element 12 changes according to the volume of the antiferromagnetic element.

In the case where an antiferromagnetic element 12 thicker than the one shown in FIG. 3B is used, as shown in FIG. 3C, the entire magnetic anisotropy of the antiferromagnetic element 12 becomes greater in proportion to the volume, so enough of a torque to overcome this and cause rotation of the sub-lattice magnetization cannot be given by the exchange coupling of the interface. Namely, when the magnetization of the ferromagnetic element 13 rotates, the action of the coupling of trying to align the spins at the two sides of the interface in the same orientation is still maintained, but the restraint requiring that the spins on two sides be aligned in the same orientation disappears. In this way, as shown in FIG. 3C, only the magnetization of the ferromagnetic element 13 reverses without a change of orientation of the sub-lattice magnetization of the antiferromagnetic element 12.

FIG. 4C shows the magnetization curve in this case. The volume of the antiferromagnetic element 13 is large, therefore even if the ferromagnetic element 13 and the antiferromagnetic element 12 are coupled at the interface, in order to reverse the magnetization M from positive to negative, a stronger magnetic field than that in the case of the antiferromagnetic element 12 having a small volume as in FIG. 3B becomes necessary. Namely, in comparison with FIG. 4B, the position where the left side of the magnetization curve of FIG. 4C cuts across the abscissa appears at a point moved in the negative direction of the H-axis of the magnetic field.

Conversely, when reversing the magnetization from negative to positive, coupling trying to align the magnetization of the ferromagnetic element 13 in the same orientation as that of the sub-lattice magnetization of the antiferromagnetic element 12 originally directed to the positive direction is maintained, therefore when the external magnetic field directing the magnetization to the negative direction is slightly weakened, the orientation of the magnetization is reversed early before the magnetic field direction changes to the positive direction. The value of this magnetic field appears at the position where the right side of the magnetization curve of FIG. 4C cuts across the abscissa.

Namely, when the volume of the antiferromagnetic element 12 is large, the coercive force does not increase in comparison with the case where there is no antiferromagnetic element 12, but the magnetization curve is offset to the negative direction on the axis of the magnetic field H. This offset will be referred to as the "exchange biasing field (Hex)".

In the asymmetric magnetization curve of FIG. 4C, only one magnetization state can be taken when the external magnetic field is zero, so this material cannot be utilized for a magnetic storage wherein the magnetization direction is changed to the intended direction.

As seen from the above explanation, in order to couple an antiferromagnetic element 12 with a ferromagnetic element 13 to realize an increase of the coercive force, the volume of the antiferromagnetic element 12 must be made in an appropriate range.

Hereinafter, the properties of the magnetic particle 10 of the present embodiment will be explained by taking as an example one using Co as the material of the ferromagnetic core 1 shown in FIG. 2 and using NiO as the material of the antiferromagnetic shell 2, that is, surrounding the Co core by NiO.

For a magnetic particle 10 of the core-shell structure to give the largest coercive force, there is an optimum combination of volume of the ferromagnetic phase 1 and the antiferromagnetic phase 2.

The change of the magnetic characteristics of a magnetic particle 10 when holding a radius $r_{FM}$ of the ferromagnetic phase core 1 constant and gradually changing a radius $r_{AF}$ of the outside of the antiferromagnetic shell 2 larger was checked for a core-shell magnetic particle 10 in a state of a substantially concentric spherical shell shown in FIG. 2., FIG. 5 and FIGS. 6A to 6C show the results thereof.

Figure 5:
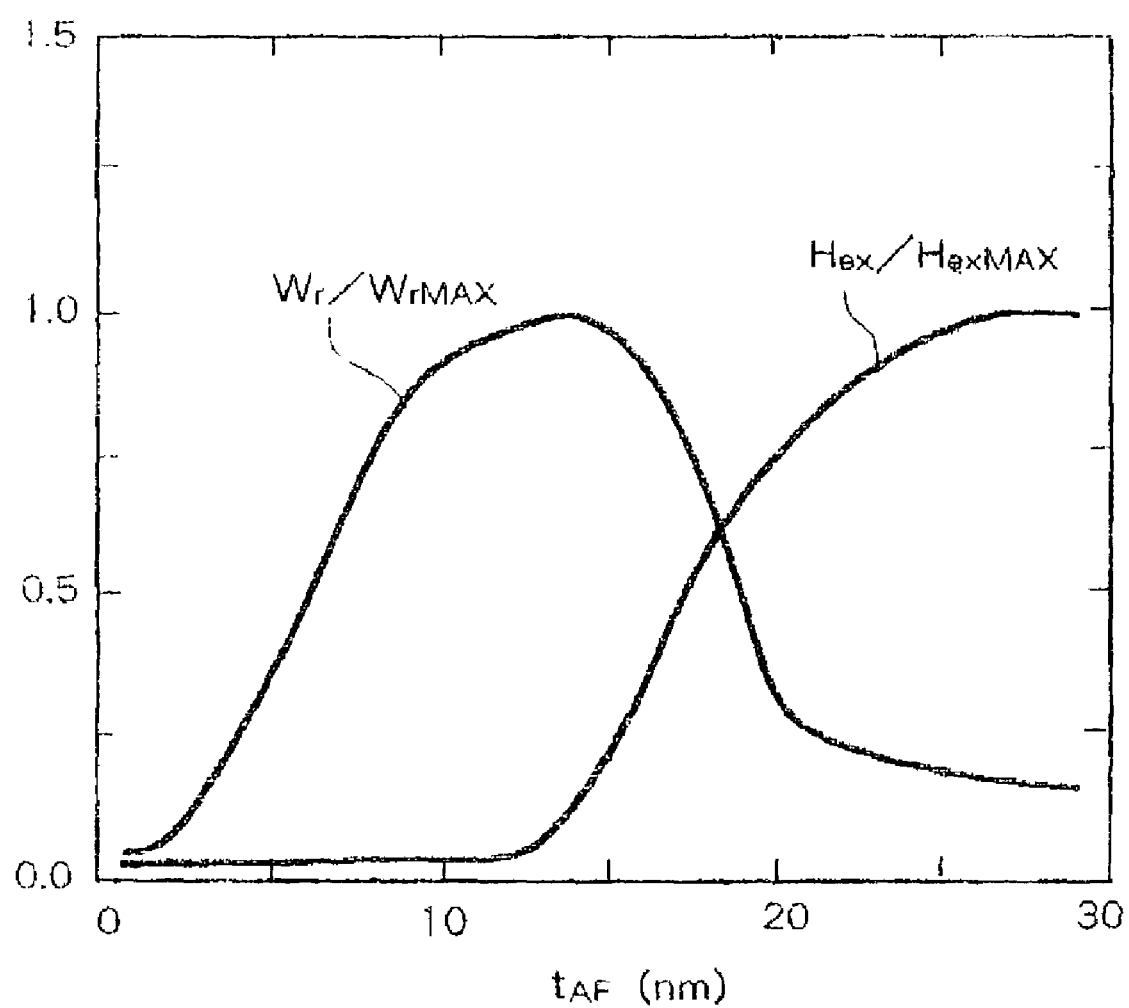
FIG. 5 is a graph of changes of a rotational hysteresis loss and an exchange biasing field in a case where a thickness of the antiferromagnetic shell in the magnetic material shown in FIG. 2 is changed.

FIG. 5 plots the change of the rotational hysteresis loss Wr (amount determined by torque measurement) and the change of the exchange biasing field Hex in the case where the radius $r_{FM}$ of the Co core 1 in the core-shell magnetic particle 10 of the concentric spherical shell state shown in FIG. 2 is held at 10 nm and the thickness $t_{AF}$ of the NiO shell 2 is changed. Here, use is made of an amount Wr/Wr$_{MAX}$ and Hex/Hex$_{MAX}$ normalized by the maximum value Wr$_{MAX}$ of the rotational hysteresis loss and the maximum value Hex$_{MAX}$ of the exchange biasing field within the range where $t_{AF}$ is changed.

FIGS. 6A to 6C show magnetization curves of magnetic particles 10 of the concentric spherical shell state shown in FIG. 2. They show the change of the coercive force due to a change of the volume (here, thickness) of the antiferromagnetic phase 2. In FIGS. 6A to 6C, the abscissas indicate an external magnetic field, and the ordinate indicates the magnetization by the ferromagnetic phase 1 of the magnetic particles 10.

When the thickness $T_{AF}$ of the antiferromagnetic shell 2 is 5 nm, as shown in FIG. 5 and FIG. 6A, no exchange biasing field Hex appears, but the rotational hysteresis loss is small, and the coercive force of the magnetic particle 10 is small.

When the thickness $T_{AF}$ of the antiferromagnetic shell 2 is increased, the rotational hysteresis loss and the coercive force increase. As shown in FIG. 5 and FIG. 6B, near a thickness $T_{AF}$ of the antiferromagnetic shell 2 of 10 nm, the rotational hysteresis loss becomes the maximum and the coercive force becomes the maximum.

When the thickness $T_{AF}$ of the antiferromagnetic shell 2 is increased more than that, as shown in FIG. 5 and FIG. 6C, the magnetization curve is laterally shifted asymmetrically, that is, an exchange biasing field Hex appears, and the coercive force becomes small.

Accordingly, in the above example, the magnetic particle 10 gives the maximum coercive force at the ratio of volume of the ferromagnetic phase 1 and the antiferromagnetic phase 2 at the time when $T_{AF}$=10 nm.

However, the thickness of the antiferromagnetic shell 2 required for obtaining an increase of the coercive force becomes a thickness not negligible in comparison with the size of the ferromagnetic core 1, so the average magnetization MAV of the entire core-shell magnetic particle 10 is represented as follows by using the magnetization $M_{FM}$ of the ferromagnetic phase 1:

$$M_{AV}=M_{FM} \times (r_{FM}/r_{AF})^3$$

Therefore, it is diluted to become considerably smaller than the magnetization of the ferromagnetic phase 1. Accordingly, in order to realize a magnetic recording medium able to provide to a reproduction head a magnetic field equivalent to that of the case of use of barium ferrite magnetic particles having for example a saturation flux density of 5 kG by core-shell structure particles of the present invention, a ferromagnetic core 1 having a saturation flux density considerably larger than 5 kG must be used.

Figure 7A:
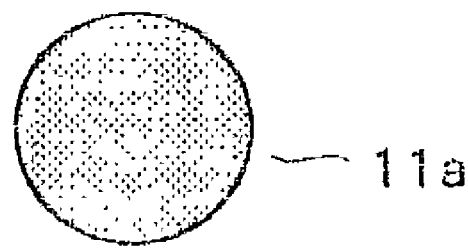
FIGS. 7A to 7C are views showing different types of particles having the same magnetization.
Figure 7B:
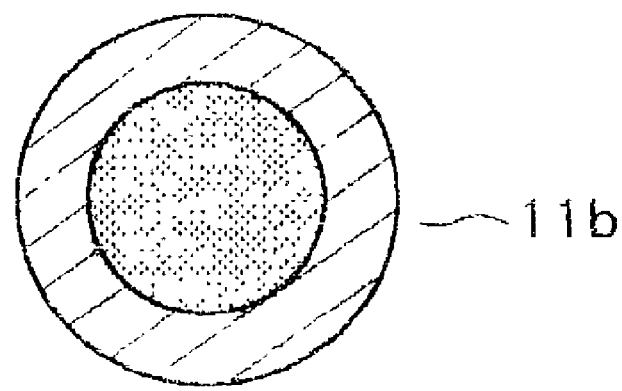
Figure 7C:
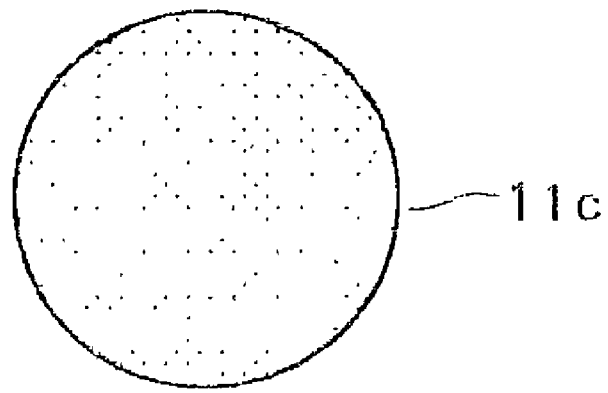

FIGS. 7A to 7C are views of different aspects of particles having the same magnetization, wherein FIG. 7A shows a case of a particle 11a having a high saturation flux density, FIG. 7B shows a case of a high saturation flux density particle 11b having an antiferromagnetic material shell, and FIG. 7C shows a case of a particle 11c having a relatively low saturation flux density.

As ferromagnetic materials having a large saturation flux, other than Co (18 kG), there are Fe (22 kG) or alloys having these as main ingredients. In the present embodiment, these are preferably used for the ferromagnetic core 1.

Of course, a magnetic material having a relatively large magnetic anisotropy and coercive force should be employed for the ferromagnetic core 1 itself. With this plus the help of the antiferromagnetic shell 2, a further improvement of characteristics can be achieved. For example, as the material of the ferromagnetic phase core 1, it is possible to use a high coercive force alloy containing at least Pt, Cr, or the like, or an Fe oxide-based magnetic material.

Note that such high coercive force alloys include ones having a relatively low ratio of magnetic atoms in the composition. Sometimes, the probability of existence at adjacent positions where the spin of the antiferromagnetic phase 2 and the spin of the ferromagnetic phase 1 can interact at the contact interface with the antiferromagnetic shell 2 becomes low.

As a means for preventing a drop in the interaction of the two phases occurring in this way, it is effective to place a magnetic metal layer 3 having a high spin density between the high coercive force alloy core 1 and the antiferromagnetic shell 2.

Figure 8:
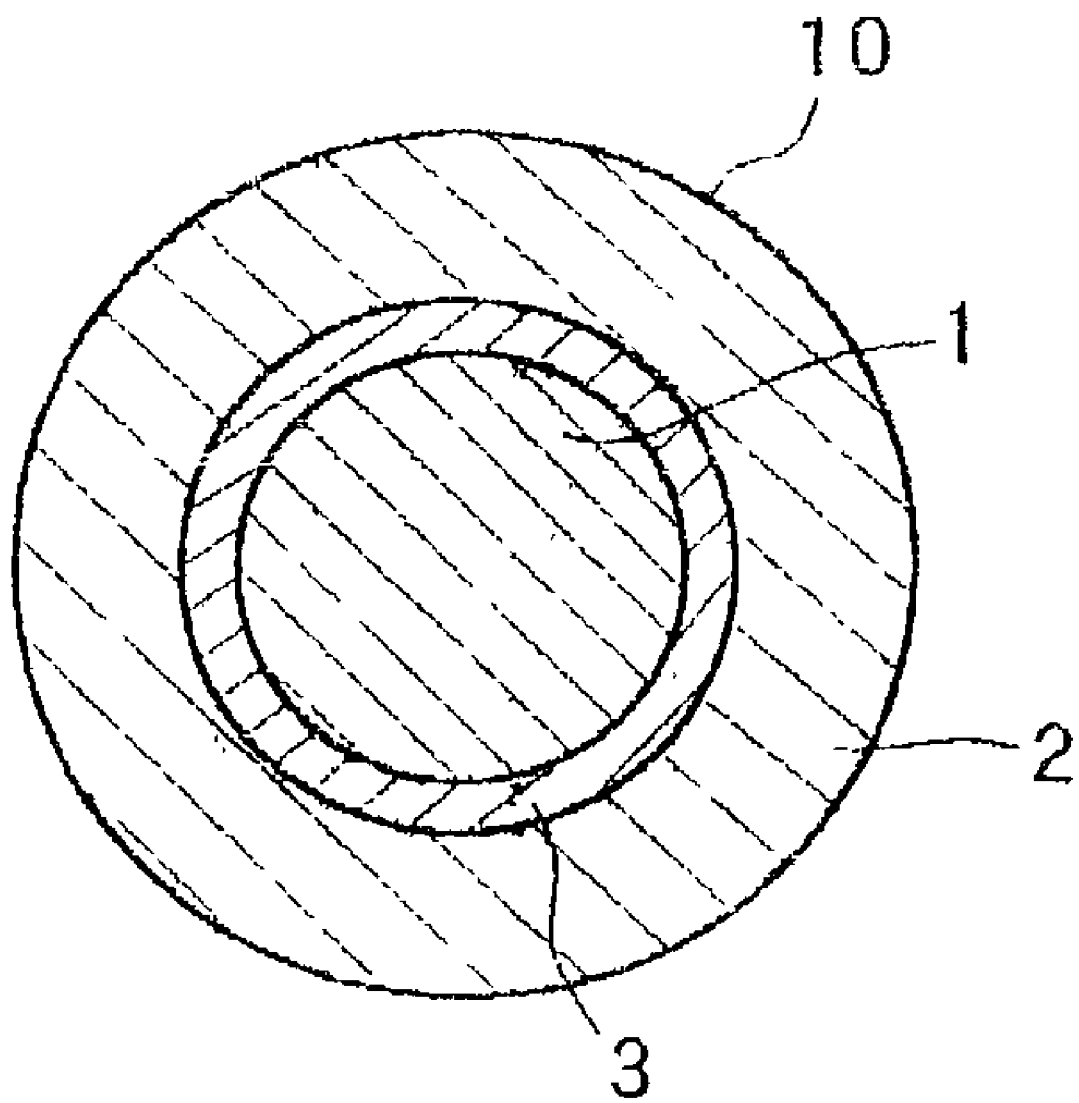
FIG. 8 is a sectional view of a structure wherein a coupling enhancement layer is provided in the magnetic material according to the first embodiment.

FIG. 8 is a sectional view of the structure where a coupling enhancement layer 3 is provided in the core-shell magnetic particle 10. For this coupling enhancement layer 3, a ferromagnetic metal layer containing for example Fe, Co, or Ni as a main ingredient is used.

A ferromagnetic metal like Fe and Co having a large magnetic moment per atom is apt to form a strong exchange coupling with a different type of material, so by interposing this, the coupling between the ferromagnetic phase 1 and the antiferromagnetic phase 2 will be raised.

For the ferromagnetic core 1, Co or another hard to oxidize metal is preferably used.

When use is made of a ferromagnetic material easily oxidized, along with the elapse of time, near the interface between an antiferromagnetic shell 2 made of for example NiO and the ferromagnetic core 1, the NiO is reduced and an oxide of the ferromagnetic material is produced. When the oxide is nonmagnetic at room temperature, the magnetic coupling between the ferromagnetic core 1 and the antiferromagnetic shell 2 becomes weak and a sufficiently large coercive force is no longer obtained.

The crystal structure of Co that forms the ferromagnetic phase core 2 is comprised of a mixture of hexagonal closest packed (hcp) planes packed in an fcc (face centered cubic) structure and packed in an hcp structure. An hcp-enriched one is advantageous since the magnetic anisotropy derived from the crystal structure becomes large.

The relationship between the size of various types of Co particles and the coercive force given by the magnetic particles for Co particles forming the ferromagnetic core 1 will be explained next based on the experimental results of FIG. 9.

Figure 9:
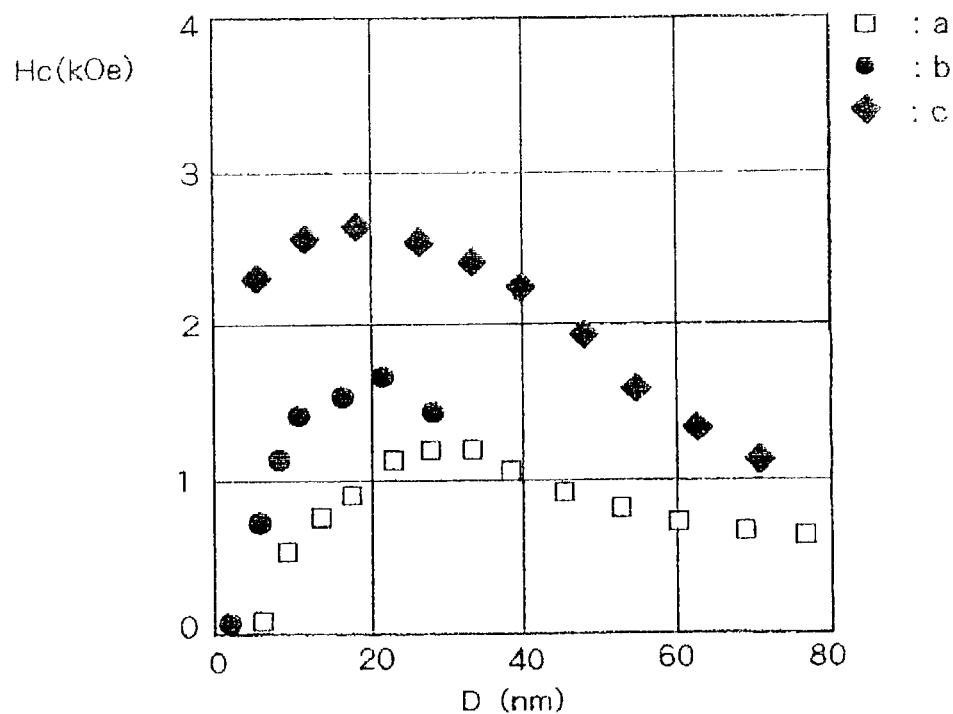
FIG. 9 is a view showing experimental results on the relationship between a diameter and coercive force in the magnetic material according to the first embodiment.

In FIG. 9, the data a, data b, and data c show the coercive force at room temperature (300 K) of a spherical Co particle with surface oxidation, the coercive force at 77 K of a spherical Co particle with surface oxidation, and the coercive force at room temperature (300 K) of a hexagonal closest packed structure (hcp)-enriched spherical Co particle with a shell of NiO having a thickness of 10 nm. Note that, in FIG. 9, the abscissa shows the diameter of the Co core 1, and the ordinate shows the coercive force of the magnetic material comprised of the Co core 1 and the shell 2.

The coercive force at room temperature (300 K) of a Co particle with surface oxidation, as shown by the data a, becomes extremal near a diameter of 30 nm.

When the same specimen is cooled to the liquid nitrogen temperature (77 K) and measured, as shown by the data b, the coercive force is not that much different from the coercive force at room temperature when the particle size is 10 nm or more, while the coercive force becomes maximum when the particle size is 20 nm.

When a slight hcp-enriched Co particle has a shell of NiO having a thickness of 10 nm, at room temperature (300 K), as shown by the data c, the coercive force is larger than that of a Co particle with surface oxidation in entire range of particle size measured.

Due to this, it was seen that by covering the ferromagnetic Co core 1 by a shell of the antiferromagnetic NiO having a thickness of 10 nm, a large coercive force was obtained by a small size of this magnetic particle having a core-shell structure.

The effect of the antiferromagnetic shell 2 becomes conspicuous when the size of the CoO particle is 30 nm or less. The increase in the coercive force at a particle size more than that is attributable to the fact that the crystal magnetic anisotropy becomes large since the particle is hcp-enriched.

The fact that the coercive force does not increase so much in the particle size range of 60 nm or more is understood to be due to the following. Namely, magnetization reversal of the fine particles occurs in the uniform rotation mode. The increase in the magnetic anisotropy (including also contribution of the magnetic anisotropy sensed by the spin group of the antiferromagnetic material exchange coupled and rotating together) is reflected in the coercive force in a substantially direct proportional relationship. This is because when the particle size becomes large, a curling mode, fanning mode, or other mode of magnetization reversal where the coercive force is not always proportional to the magnitude of the magnetic anisotropy becomes the main mode.

In order to use this for a magnetic coating for a super-high density magnetic recording medium, a particle size of 10 to 60 nm is preferred. The present embodiment has a valid effect within this range of particle size.

The function of the antiferromagnetic shell 2 made of NiO surrounding the ferromagnetic core 1 made of Co will be explained next based on experimental data of the relationship between the coercive force and temperature with reference to FIG. 10. The diameter of the ferromagnetic core 1 is set at 10 nm.

Figure 10:
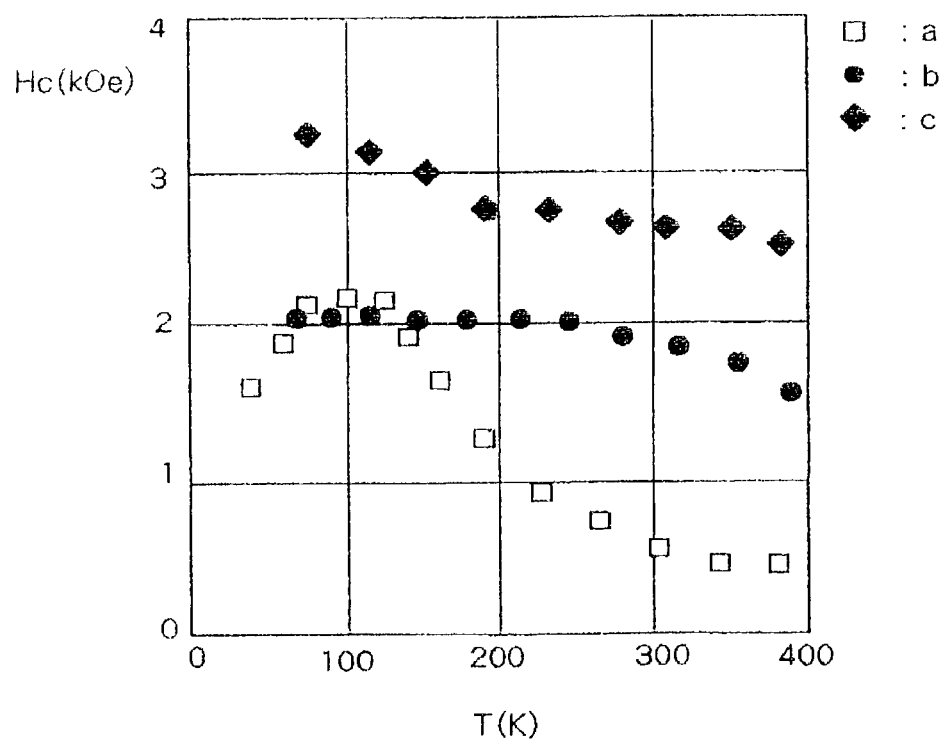
FIG. 10 is a view showing experimental results on a temperature dependency of the coercive force in the magnetic material according to the first embodiment.

In FIG. 10, the data a, data b, and the data c show the temperature dependency of coercive force in the cases of a Co particle with surface oxidation, a Co particle with a shell of NiO having a thickness of 10 nm, and an hcp-enriched Co particle with a shell of NiO having a thickness of 10 nm.

A Co particle with surface oxidation (data a) and a Co particle with a shell of NiO having a thickness of 10 nm (data b) exhibit equivalent coercive forces at a low temperature near 100 K. When the temperature rises to 150 K or more, the coercive force of the Co particle with surface oxidation is conspicuously lowered, but, as shown by the data b, the coercive force of the Co particle with a shell of NiO is not reduced so much over a temperature range up to 400 K. Namely, a Co particle with a shell of NiO is suitable for a magnetic recording medium used in a room temperature environment.

When using an hcp-enriched Co particle, as shown by the data c, the crystal magnetic anisotropy of the Co particle itself becomes large, therefore a high coercive force is obtained over a wide temperature range by a synergistic effect with the function of the NiO shell and, in addition, the fluctuation of the coercive force is small.

The antiferromagnetic material loses antiferromagnetic order at a certain temperature or more. This critical temperature is referred to as the "Neel temperature" and defined as for example $T_N$.

Also, the highest temperature at which a contacting ferromagnetic material exhibits a restraining force on magnetization will be referred to as the "blocking temperature" and defined as for example $T_B$.

The high coercive force of the Co particle with surface oxidation at a low temperature is due to the fact that the Neel temperature of the CoO phase of the surface is near 300 K, so the CoO phase of the surface has a stable antiferromagnetic spin order in a low temperature region.

Since the Neel temperature of NiO is near 520 K, or far higher, with a particle with an NiO shell, this action is maintained up to room temperature or more. Also, fabrication of NiO is easy. For this reason, a core-shell structure of a metal Co core 1 surrounded by an NiO shell 2 is the most practical structure of the present embodiment.

While NiO was used as an example as the material of the antiferromagnetic shell 2 above, it is also possible to use other materials.

Next, a more detailed description will be given of the material of the antiferromagnetic phase material of the present invention.

The magnetic material of the present embodiment includes a ferromagnetic phase 1 able to exchange information with a magnetic head via a magnetic field and an antiferromagnetic phase 2 which does not generate a magnetic field in space and does not receive torque from the magnetic field while holding magnetic order inside the material.

As usable antiferromagnetic materials, a wide range of materials such as alloys, oxides, and fluorides can be utilized so long as they exhibit antiferromagnetic order at a temperature more than the operating temperature of the magnetic recording device.

As materials maintaining antiferromagnetic order up to a temperature higher than room temperature (more than 300 K), there are Ni—Mn, Pt—Mn, Pt—Cr—Mn, and Pd—Pt—Mn. As materials which can be prepared without necessity of heat treatment, there are Fe—Mn, Ir—Mn, Rh—Mn, Ru—Mn, Pt—Cr—Mn, Cr—Al, and the like.

Other than alloys, it is also possible to use the antiferromagnetic materials of oxides or fluorides. Oxide materials are excellent in the point of resistance to corrosion.

Mn exhibits antiferromagnetism in the γ phase (gamma phase) and exhibits antiferromagnetism in a considerably wide range of composition even alloyed with a 3d transition metal or precious metal, so is a constituent element of an alloy suited to the present embodiment. Particularly, a composition wherein the ratio of the number of atoms of Mn is 40% or more can give good characteristics.

As examples of antiferromagnetic materials of fluorides, there are $FeF_2$, $MnF_2$, $K_2NiF_4$, and the like. Some of them lose antiferromagnetic order at a temperature lower than room temperature, but these can be utilized in combination with different types of substances sustaining antiferromagnetism up to a high temperature.

As materials having properties resembling antiferromagnetic materials (small magnetization and large magnetic anisotropy) and suitable for the present embodiment, ferrimagnetic materials having compositions close to compensation compositions can be utilized. Alloys of rare earth metals and transition metals, for example, Tb—Co alloys, are candidates.

As mentioned above, CoO has a Neel temperature near room temperature and does not strongly hold antiferromagnetic order at room temperature, so cannot be utilized alone in the present embodiment. With a solid solution or a multilayer laminate (artificial lattice film) of CoO and NiO, however, a Neel temperature between the Neel temperatures of CoO and NiO can be realized. At this time, when compared with pure NiO, the Neel temperature is lowered, but CoO has a larger magnetic anisotrophy energy than NiO, so the contribution thereof can be utilized. There are also some materials mentioned above which have low Neel temperatures, but these can be used by forming such complexes.

The optimum thickness of the antiferromagnetic shell 2 for obtaining the maximum coercive force in the magnetic particle 10 of the present embodiment was investigated for various antiferromagnetic materials. Table 1 lists the results thereof.

The thickness of the antiferromagnetic shell 2 preferred for obtaining an increase of the coercive force by coupling with a ferromagnetic particle 1 is near the maximum of the rotational hysteresis loss as mentioned above. This is determined by both of the magnetic anisotropy of the antiferromagnetic material 2 and the strength of coupling between the antiferromagnetic phase 2 and the ferromagnetic phase 1, so the optimum thickness of the antiferromagnetic shell changes according to the material and preparation conditions of the ferromagnetic phase 1.

When aiming at an increase in the coercive force at room temperature, there are the experimental results as shown in Table 1 for the range of the optimum value of the antiferromagnetic shell thickness.

TABLE 1

| Optimum Value of Antiferromagnetic Shell Thickness | |
| --- | --- |
| Material | Preferred thickness (nm) |
| Fe-Mn | 2–4 |
| N-Mn | 3–10 |
| Ir-Mn | 2–5 |
| Pt-Mn | 3–8 |
| Pd-Pt-Mn | 7–15 |
| Rh-Mn | 4–7 |
| Pt-Cr-Mn | 4–10 |
| Cr-Al | 5–20 |
| Tb-Co | 2–10 |
| NiO | 4–20 |

One property generally required for a recording medium is that it does not corrode in the usage or storage environment. Particularly, corrosion becomes the serious problem along with increased fineness. This will be explained using results of an experiment on the corrosion resistance of an Fe powder magnetic material not having an antiferromagnetic shell.

Figure 11:
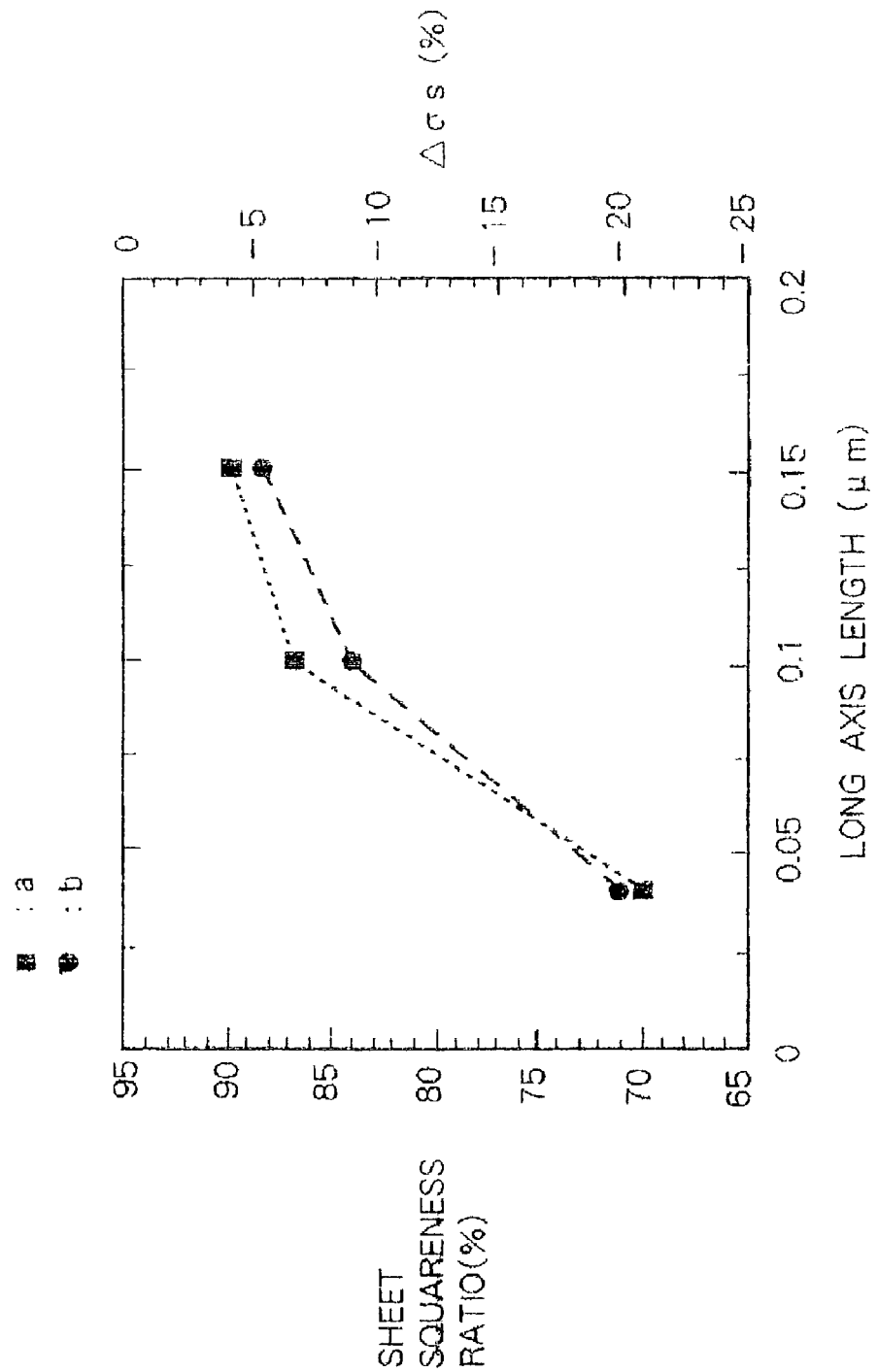
FIG. 11 is a view showing experimental data on corrosion resistance of the fine particle magnetic material shown in the first embodiment of the present invention.

FIG. 11 shows experimental data of the corrosion resistance of an Fe powder magnetic material containing 30% of Co in terms of number of atoms. The data a shows the sheet squareness ratio of the powder magnetic material, while the data b shows the dependency of the change $\Delta\sigma s$ of the relative saturation magnetization of the powder magnetic material upon the long axis length of granules of the powder.

The squareness ratio is the ratio between the magnetization of the magnetic material when the external magnetic field is zero, that is, the residual magnetization, and the saturation magnetization of the magnetic material.

The sheet squareness ratio shown in FIG. 11 was found by adding 20 parts by weight of a vinyl chloride resin to 100 parts by weight of Fe powder, dispersing the mixture together with a 1/1 mixture of methylethylketone and cyclohexanon, and drying the resultant coating by a doctor blade under an orientation magnetic field of 2 kOe to prepare a coating film on a PET film and finding a residual flux density/saturation flux density ratio in the orientation direction by a vibrating-sample magnetometer (VSM).

The change $\Delta\sigma s$ of the relative saturation magnetization shown in FIG. 11 expresses the amount of reduction of the saturation magnetization from an initial value after the Fe powder is held under an environment of 60° C./90% RH for one week.

As shown by the data a and b, as the size (here, long axis) of the particles of the Fe powder magnetic material becomes smaller, the sheet squareness ratio and the magnetization are conspicuously lowered. This is caused by the oxidation of the particles of the Fe powder magnetic material.

Accordingly, FIG. 11 shows the problem that the corrosion resistance of the magnetic material is conspicuously lowered along with the increased fineness of the magnetic material.

In the present embodiment, desirably an antiferromagnetic material not corroding under the usage or storage environment is used.

An oxide antiferromagnetic material is excellent in corrosion resistance in comparison with a metal. NiO is a typical oxide exhibiting antiferromagnetic order at the operating environment of a magnetic recording device, that is, room temperature or more. Also the $\alpha$-$Fe_2O_3$ and $Cr_2O_3$ exhibit antiferromagnetism at room temperature. The properties can also be adjusted by a solid solution comprised mainly of NiO plus other materials. One example of this would be to prepare a solid solution of NiO having a Neel temperature $T_N$ near 520 K and CoO having a Neel temperature of 293 K or lower than room temperature, but having a magnetic anisotropy larger than NiO so as to obtain a material having a larger magnetic anisotropy than that of NiO at room temperature. Also, an antiferromagnetic material comprised of a complex of NiO and CoO can be utilized for the same purpose.

Further, even with a metal, the corrosion resistance is often enhanced with an alloy of a precious metal such as Ir—Mn, Pt—Mn, Pd—Pt—Mn, Rh—Mn, and Pt—Cr—Mn.

The heat resistance of an antiferromagnetic material will be explained next.

The antiferromagnetic material used as a component of the magnetic particle of the present embodiment is preferably one maintaining its antiferromagnetic magnetization order and maintaining coupling with magnetization of the ferromagnetic material at room temperature and an environment where the temperature rises. Particularly, when looking at the region where the recording medium and the magnetic head face each other in a magnetic recording device, there is a possibility that the temperature will locally become much higher on the medium than the ambient temperature due to friction by head contact or discharge of charged static electricity. In order to hold the recording against this, an antiferromagnetic material having a high heat resistance is necessary.

As already mentioned, at the Neel temperature $T_N$ or more, the antiferromagnetic material loses its antiferromagnetic order. Also, at the blocking temperature $T_B$ or more, the contacting ferromagnetic material loses its restraining force on magnetization. From the standpoint of thermal stability, an antiferromagnetic material having a high $T_B$ is desirable as the antiferromagnetic material utilized in the present embodiment. $T_B$ is ordinarily much lower than $T_N$, but roughly speaking, there is a tendency that a material having a higher $T_N$ will have a higher $T_B$. Materials known to have a high $T_B$ are listed in Table 2. Among these materials having a high $T_N$, many materials are given the antiferromagnetism by their components being regularly aligned and regular crystals being formed. Normalization does not occur unless heat treatment is carried out at a certain heat treatment temperature Ta or more. This can restrict production, but when a treatment temperature of 300° C. or less is sufficient, it can be reached by substrate heating ordinarily carried out at a time when the medium's thin films are stacked and does not especially become an obstacle.

TABLE 2

| | Characteristic Temperature of Antiferromagnetic Material | | |
|---|---|---|---|
| Material name | $T_B$ (° C.) | $T_N$ (° C.) | Ta (° C.) |
| Ni-Mn | 450 | 797 | 280 |
| Pt-Mn | 380 | 702 | 280 |
| Pt-Cr-Mn | 380 | | |
| Pd-Pt-Mn | 300 | | 230 |

According to the present embodiment, by coating a material having a ferromagnetic phase at ordinary temperature by a material having an antiferro-magnetic phase at ordinary temperature, the thermal fluctuaction is suppressed and a higher coercive force is obtained while satisfying the further increased fineness of the magnetic particles.

The ferromagnetic phase is isolated by the antiferromagnetic phase shell and does not contact others, therefore a good dispersion state of the magnetic material can be held in a magnetic recording medium comprised of a plurality of magnetic particles.

By providing a shell of a material having an antiferromagnetic phase at ordinary temperature, a high coercive force is obtained in a very wide temperature range (for example, in a range of at least about 100 K to about 400 K) and the corrosion resistance and the thermal stability are excellent.

The particle size preferred so as to obtain the best effect of the present invention by the shell of the antiferromagnetic phase is a small 10 nm to 60 nm, so this is advantageous for the increased fineness of magnetic particles.

Second Embodiment

Figure 12:
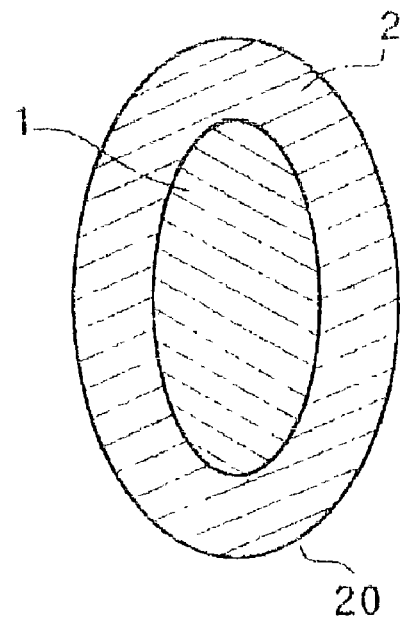
FIG. 12 is a sectional view of a magnetic material comprised of a coexisting ferromagnetic phase and antiferromagnetic phase according to a second embodiment of the present invention.

In the present embodiment, the magnetic material comprised of a coexisting ferromagnetic phase and antiferromagnetic phase has a core-shell structure shown in FIG. 12 wherein a magnetic particle 20, that is, a ferromagnetic phase 1, forms a core exhibiting a spindle shape and the periphery thereof is surrounded by an antiferromagnetic phase material 2 in the form of a shell.

In the present embodiment, the same reference numerals are used for the same components as in the first embodiment, and overlapping explanations will be omitted.

In a recording medium comprised of magnetic particles 20 having such a core-shell structure, even if two or more particles contact, since the ferromagnetic phases 1 are isolated by the shells of the antiferromagnetic phase 2 so that they do not directly touch each other, the energy for gathering together a plurality of particles by magnetic force to form secondary particles is small. Accordingly, it is easy to obtain a magnetic powder coating film with a good dispersion state of magnetic particles.

By providing a coexisting ferromagnetic phase 1 and antiferromagnetic phase 2 in each magnetic particle 20, the magnetic particles 20 are resistant to the thermal fluctuaction and a high coercive force can be maintained even with increased fineness of the magnetic particles 20.

In the same way as the first embodiment, there is an optimum combination of volumes of the ferromagnetic phase 1 and the antiferromagnetic phase 2 for obtaining the maximum coercive force. Namely, the coercive force becomes the maximum near the thickness of the antiferromagnetic shell 2 by which the rotational hysteresis loss becomes the maximum. When the thickness of the antiferromagnetic shell 2 is increased more than that, the magnetization curve is laterally shifted asymmetrically, an exchange biasing field Hex appears, and the coercive force becomes small.

Accordingly, the ratio of volumes of the ferromagnetic phase 1 and the antiferromagnetic phase 2 at the time when the rotational hysteresis loss becomes maximum and the exchange biasing field has not appeared enables the magnetic particle 20 to give the maximum coercive force.

Also, the thickness of the antiferromagnetic shell 2 required for obtaining an increase of the coercive force becomes a thickness not negligible in comparison with the size of the ferromagnetic core 1, therefore the magnetization of the ferromagnetic phase 1 is diluted considerably small. Accordingly, a ferromagnetic core having a considerably large saturation flux density must be used.

As a core material having a large saturation flux, other than Co (18 kG), Fe (22 kG) or alloys containing them as main ingredients are preferred.

It is also possible to employ a magnetic recording medium material having a relatively large magnetic anisotropy and coercive force for the ferromagnetic core 1 itself and with this plus the help of the antiferromagnetic material achieve a further improvement of the characteristics. For example, as the material of the ferromagnetic phase 1, it is also possible to utilize a high coercive force alloy containing at least Pt, Cr, or the like or an Fe oxide-based magnetic material.

Note that some high coercive force alloys have a relatively low ratio of magnetic atoms in the composition. Sometimes, the probability of existence at adjacent positions where the spin of the antiferromagnetic phase and the spin of the ferromagnetic phase can interact at the contact interface with the antiferromagnetic material becomes low. As a means for preventing the drop in the interaction of the two phases in this way, it is effective to place a magnetic metal layer having a high spin density between the high coercive force alloy core and the antiferromagnetic shell.

Figure 13:
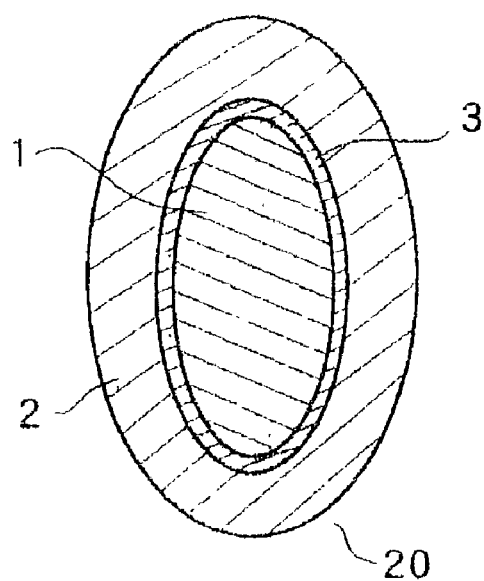
FIG. 13 is a sectional view of a structure wherein a coupling enhancement layer is provided in the magnetic material according to the second embodiment.

FIG. 13 is a sectional view of a structure wherein a coupling enhancement layer 3 is provided in a core-shell magnetic particle 20. As this coupling enhancement layer 3, it is also possible to use a ferromagnetic metal layer containing for example Fe, Co, or Ni as a main ingredient.

A ferromagnetic metal like Fe and Co where the magnetic moment per atom is large is apt to form strong exchange coupling with a different type of material, so by interposing this, coupling between the ferromagnetic phase 1 and the antiferromagnetic phase 2 will be raised.

Figure 14:
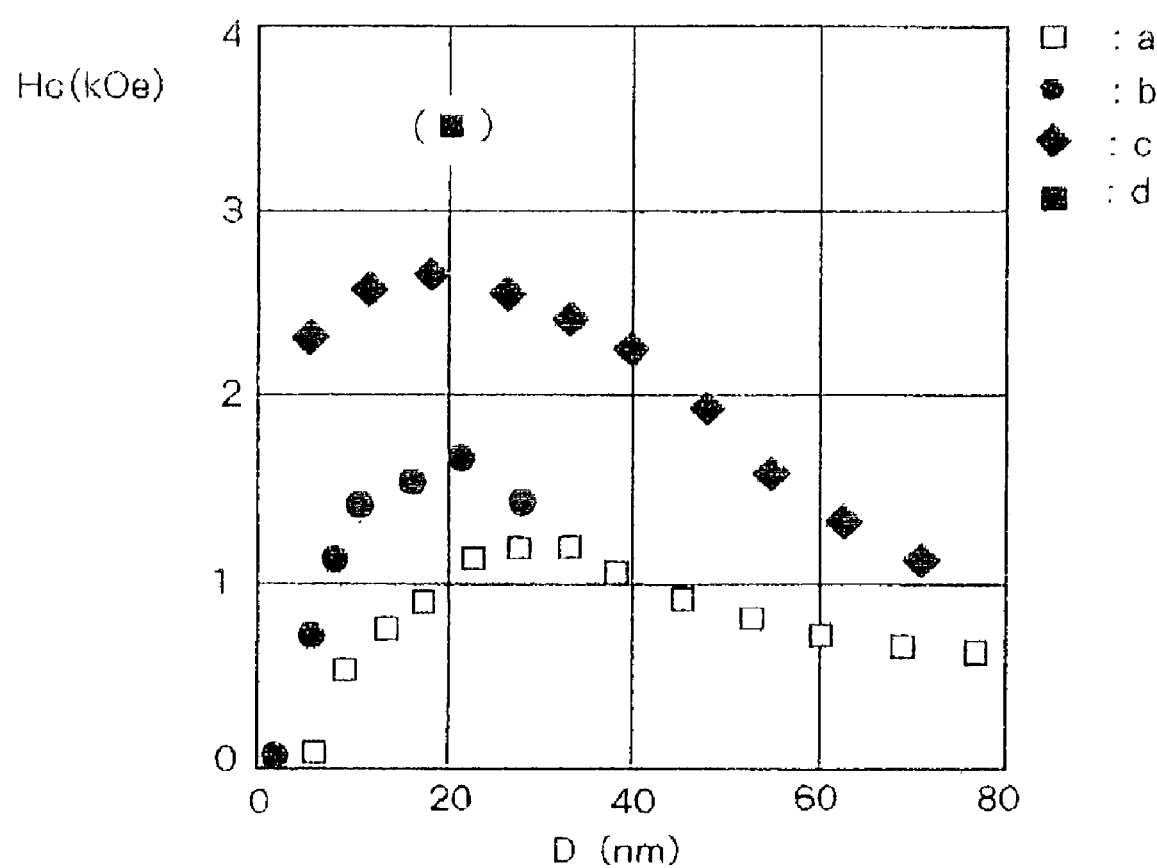
FIG. 14 is a view showing experimental results on the relationship between the diameter and the coercive force in the magnetic material according to the second embodiment.

FIG. 14 is a view showing comparison of the characteristics of the magnetic particles 20 of the present embodiment and the experimental results of the characteristics of the magnetic particles according to the first embodiment.

In FIG. 14, the data a, data b, and the data c show the coercive force at room temperature (300 K) of a spherical Co particle with surface oxidation, the coercive force at 77 K of a spherical Co particle with surface oxidation, and the coercive force at room temperature (300 K) of a spherical hcp-enriched Co particle with an NiO shell having a thickness of 10 nm similar to FIG. 9, while the data d shows the coercive force at room temperature (300 K) in an hcp-enriched spindle-state Co particle having a short diameter of 20 nm and a long diameter of 40 nm with an NiO shell having a thickness of 10 nm. Note that, the abscissa indicates the length of the diameter or short axis of the Co core 1, and the ordinate indicates the coercive force of the magnetic material comprised of the Co core 1 and the shell 2.

As shown by the data d, an hcp-enriched spindle-state Co particle having a short diameter of 20 nm and a long diameter of 40 nm with an NiO shell having a thickness of 10 nm gives the highest coercive force, i.e., 3.52 kOe, at room temperature in comparison with the data a, data b, and data c in the case of spherical Co particles.

The crystal structure of a ferromagnetic phase core 2 made of Co is comprised of a mixture of hexagonal closest packed planes packed in an fcc structure and packed in an hcp structure. An hcp-enriched structure is advantageous since the magnetic anisotropy derived from the crystal structure becomes large. When the c-axis of this hcp component coincides with the long axis direction of the particle outer shape, the contribution of the shape anisotropy and the crystal magnetic anisotropy can be additionally utilized.

When covering a ferromagnetic core 1 made of Co by an NiO shell to form a spindle-shaped magnetic particle 20 such as shown in FIG. 12, shape magnetic anisotropy is obtained, so this is advantageous so as to obtain a high coercive force. A particularly preferred range of the shape ratio is a range of 1.2<(long axis/short axis)<5. When this ratio is smaller than 1.2, the effect of producing the anisotropy according to the shape is small, while if it is 5 or more, agglomeration of the particles becomes apt to occur.

As an example of the preferred size of the magnetic particle 20 of the present embodiment, the size of the core shown in FIG. 12 is 20 nm in the short axis direction and 40 nm in the long axis direction, while the size of the entire magnetic particle becomes 40 nm in the short axis direction and 60 nm in the long axis direction.

Regarding the relationship between the coercive force and the temperature, in the same way as the first embodiment, even if the temperature changes in a wide range, the coercive force of a magnetic particle obtained by covering a Co core by an NiO shell is not reduced that much, so this is suitable for a magnetic recording medium used in a usage environment of room temperature or more. Particularly, when an hcp-enriched Co particle is used, the crystal magnetic anisotropy of the Co particle itself becomes large, therefore a high coercive force is obtained over a wide temperature range by the synergistic effect with the function of the NiO shell.

In the present embodiment, the selection of the ferromagnetic material and the antiferromagnetic material is basically the same as that of the first embodiment.

According to the present embodiment, the thermal fluctuation is suppressed and a higher coercive force is obtained while satisfying the need for further fineness of the magnetic particles.

The ferromagnetic phase is isolated by the antiferromagnetic phase shell and does not contact others, so a good dispersion state of the magnetic material can be held.

By forming a shell of a material having an antiferromagnetic phase at ordinary temperature, a high coercive force is obtained over a very wide temperature range and the thermal stability is excellent.

The preferred particle size for obtaining the best effect of the present invention by the shell of the antiferromagnetic phase is a small 10 nm to 60 nm. This is advantageous for the increased fineness of the magnetic particles.

Third Embodiment

Figure 15:
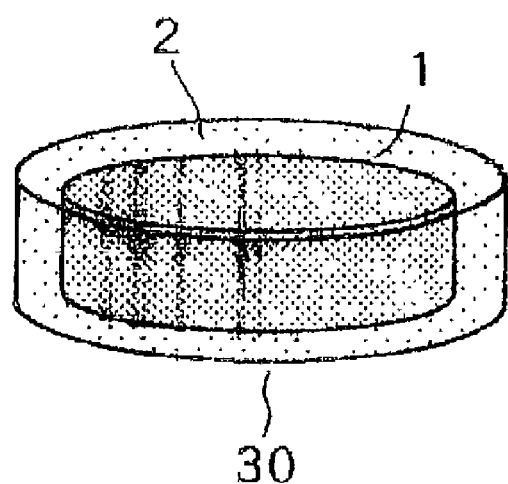
FIG. 15 is a perspective view of a disk-like magnetic particle comprised of a coexisting ferromagnetic phase and antiferromagnetic phase according to a third embodiment of the present invention.

In the present embodiment, the magnetic material comprised of the coexisting ferromagnetic phase and the antiferromagnetic phase has a core-shell structure where a magnetic particle 30 shown in FIG. 15, that is, the ferromagnetic phase 1, becomes a core of a disk-like shape and the periphery thereof is surrounded by an antiferromagnetic phase material 2 in the form of a shell.

Even in a recording medium comprised of magnetic particles 30 having such a core-shell structure, it is easy to obtain a magnetic powder coating film in the good dispersion state of magnetic particles.

In the present embodiment, the same reference numerals are used for same components as in the above embodiments, and overlapping explanations will be omitted.

Also, by providing the coexisting ferromagnetic phase 1 and antiferromagnetic phase 2 in each magnetic particle 30, even with further fineness of the magnetic particles 30, the magnetic particles 30 are resistant to the thermal fluctuation and can hold a high coercive force. The reason is similar to that of the first embodiment.

The characteristics of the magnetic particle 30 of the present embodiment will be explained by taking as an example one obtained by surrounding a core of a ferromagnetic phase material Co by an antiferromagnetic phase material NiO.

When the magnetic particle 30 and the ferromagnetic phase Co core 1 thereof are formed in a disk shape as shown in FIG. 15, by coating a paste containing the particles while applying a force pressing against it, there is the advantage that a coating film having surfaces of the disks arranged parallel to the substrate surface can be formed.

Investigation revealed that as an example of the preferred size of the magnetic particle 30 of the present embodiment, the diameter of the core shown in FIG. 15 is about 40 nm and the height of the disk is about 20 nm.

In the same way as the first and second embodiments, in the magnetic particle 20 of the core-shell structure described above, there is an optimum combination of volumes of the ferromagnetic phase 1 and the antiferromagnetic phase 2 in order to obtain the maximum coercive force. Namely, the magnetic particle 30 gives the maximum coercive force with a ratio of volumes of the ferromagnetic phase 1 and antiferromagnetic phase 2 at the time when the rotational hysteresis loss becomes maximum and no exchange biasing field appears.

Also, the magnetization of the ferromagnetic phase 1 is diluted considerably small by the thick antiferromagnetic shell 2, therefore one having a fairly large saturation flux density of the ferromagnetic core must be used. As a core material having a large saturation flux, other than Co (18 kG), Fe (22 kG) or alloys containing them as main ingredients are preferred.

It is also possible to employ a magnetic material having a relatively large magnetic anisotropy and coercive force for the ferromagnetic core 1 itself and, with this plus the help of the ferromagnetic material, achieve a further improvement of the characteristics. For example, as the material of the ferromagnetic phase 1, it is also possible to utilize a high coercive force alloy containing at least Pt, Cr, or the like or an Fe oxide-based magnetic material.

Also, although not illustrated, by providing a magnetic metal layer having a high spin density, for example, a ferromagnetic metal layer containing Fe, Co, or Ni as a main ingredient as a coupling enhancement layer between the high coercive force alloy core and the antiferromagnetic shell, the coupling between the ferromagnetic phase and the antiferromagnetic phase will be raised.

In the present embodiment; the selection of the ferromagnetic material and the antiferromagnetic material is basically the same as that of the first embodiment.

According to the present embodiment, a thin film state magnetic medium can be easily formed. The rest of the effects are the same as those of the first and second embodiments.

Fourth Embodiment

The method of production of the magnetic particles 10, 20, and 30 having the core-shell structure shown in FIG. 2, FIG. 12, and FIG. 15 will be explained next.

A particle of a structure of a Co core surrounded by NiO can be produced by oxidizing the outer periphery of a structure of Co coated by Ni metal in an oxygen atmosphere. The oxide of the Co, that is, the CoO, hinders the coupling of Co and NiO, so the oxidation region in the oxygen atmosphere is kept to the range not producing CoO. Also, a particle of a structure of the Co core surrounded by Ni, which is targeted by the oxidation treatment, is obtained by supplying Co and Ni one after another by vapor deposition in an inert gas. Concretely, a metal cluster/fine particles are grown while generating a metallic vapor under conditions of a relatively high pressure of 100 mTorr or more and a mean free path of a 20th, 30th, etc. of a vacuum vapor deposition tank dimension and repeating collision in the inert gas.

The size of the core and the thickness of the shell are determined based on the principle that the rotational hysteresis loss is made the maximum and no exchange biasing field appears.

When the core is formed by a high coercive force alloy, a magnetic metal layer having a high spin density containing for example Fe, Co, or Ni as its main ingredient is formed between the high coercive force alloy core and the antiferromagnetic shell.

By supplying heat energy to the particle and gradually cooling it in the step of preparing the Co particle, the Co crystal can be hcp enriched and a spindle-like particle extending in the c-axis direction thereof can be grown. As the method of supplying the energy, use can be made of electron beam impact, infrared ray irradiation, and induction heating by AC or microwaves.

The materials of the ferromagnetic material and the antiferromagnetic material are selected as mentioned in the first embodiment.

In the selection of the material of the antiferromagnetic material, the ease of production should also be considered.

A disordered alloy giving antiferromagnetism does not require heat treatment or substrate heating up to a high temperature and can easily give an antiferromagnetic thin film by a thin film preparation process such as sputtering, so is suitable for production. For example, alloys of compositions of Fe—Mn, Ir—Mn, Rh—Mn, Ru—Mn, Pt—Cr—Mn, and Cr—Al can be utilized.

According to the method of production of a magnetic particle comprised of a ferromagnetic phase core and antiferromagnetic phase shell of the present embodiment, a magnetic material sufficiently satisfying the requirement of increased fineness of magnetic particles, holding a good dispersion state of magnetic particles, further raising the magnetic anisotrophy energy and coercive force, excellent in corrosion resistance and thermal stability, and able to cope with further higher density recording can be realized.

Fifth Embodiment

In the above embodiments, as a magnetic particle comprised of a coexisting ferromagnetic phase and antiferromagnetic phase, a magnetic particle of the core-shell structure wherein the ferromagnetic phase core was surrounded by an antiferromagnetic phase material shell was explained, but in the present embodiment, another form of a magnetic particle comprised of a coexisting ferromagnetic phase and antiferromagnetic phase will be explained.

Figure 16:
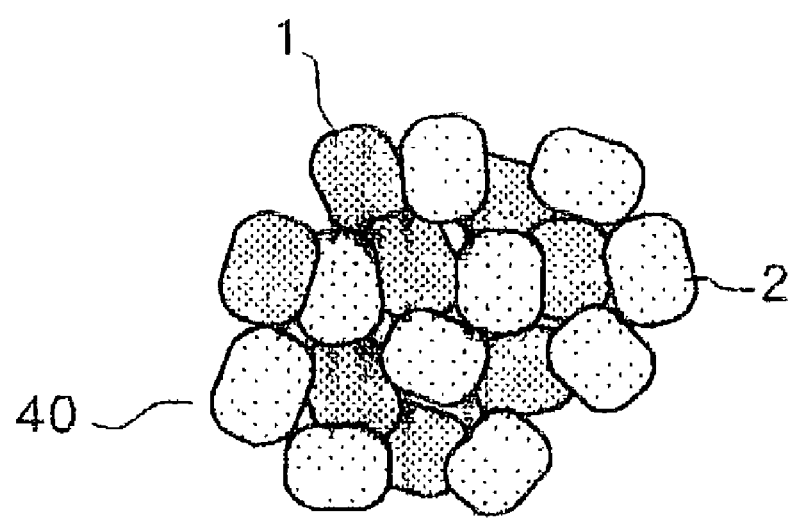
FIG. 16 is a sectional view of a magnetic particle comprised of a coexisting ferromagnetic phase and antiferromagnetic phase according to a fifth embodiment of the present invention.

Both of the ferromagnetic phase material and the antiferromagnetic phase material which must be coupled with each other in the present embodiment do not have to be in the form of layers. For example, as shown in FIG. 16, it is also possible for a plurality of particles to be gathered and form a larger complex particle 40 and for antiferromagnetic phases 2 to be included between ferromagnetic phases 1 or conversely ferromagnetic phases 1 to be included between antiferromagnetic phases 2.

In order to utilize this as a high density magnetic recording medium, the size of a composite particle coupled by magnetic coupling is preferably several tens of nm.

In the same way as a magnetic particle of the core-shell structure, in a magnetic particle 40 of the structure described above, there is an optimum combination of volumes of the ferromagnetic phases 1 and the antiferromagnetic phases 2 in order to obtain the maximum coercive force. Namely, in the composite magnetic particle 40, the ratio of the volume of the ferromagnetic phases 1 and the volume of the antiferromagnetic phases 2 is a range where no exchange biasing field appears and the rotational hysteresis loss is made the maximum.

In the present embodiment as well, in the same way as the first embodiment, the materials of the ferromagnetic phase 1 and the antiferromagnetic phase 2 are selected and the sizes are determined so that a high coercive force and magnetic anisotrophy energy and a good corrosion resistance and thermal stability are achieved.

According to the present embodiment, by bringing a substance having a ferromagnetic phase at ordinary temperature into contact with a substance having an antiferromagnetic phase at ordinary temperature, a higher coercive force is obtained without the thermal fluctuaction while satisfying the requirement of increased fineness of the complex magnetic particles.

By coating the substance having the antiferromagnetic phase at ordinary temperature, a high coercive force is obtained in a very wide temperature range and the thermal stability is excellent.

Sixth Embodiment

Figure 17:
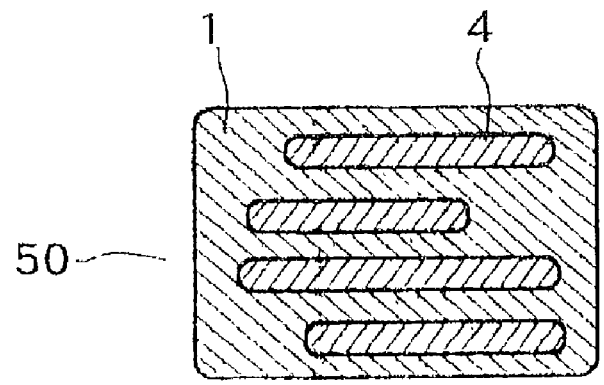
FIG. 17 is a sectional view of a magnetic particle comprised of a coexisting ferromagnetic phase and antiferromagnetic phase according to a sixth embodiment of the present invention.

In the present embodiment, as a magnetic particle comprised of a coexisting ferromagnetic phase and antiferromagnetic phase, a composite particle 50 comprised of antiferromagnetic precipitates 4 coated by a ferromagnetic phase 1 is formed as shown in FIG. 17.

As mentioned above, in order to utilize it as for a high density magnetic recording medium, the size of one composite particle coupled by magnetic coupling is preferably several tens of nm.

In a magnetic particle 50 having the structure described above, there is an optimum combination of volumes of the ferromagnetic phase 1 and the antiferromagnetic precipitates 4 in order to obtain the maximum coercive force. Namely, in the composite magnetic particle 50, the ratio between the volume of the ferromagnetic phase 1 and the volume of the antiferromagnetic precipitates 4 is a range where no exchange biasing field appears and the rotational hysteresis loss is made the maximum.

In the present embodiment as well, in the same way as the first embodiment, the materials of the ferromagnetic phase 1 and the antiferromagnetic precipitates 4 are selected and the sizes are determined so as to achieve a high coercive force and a good corrosion resistance and thermal stability.

The present embodiment exhibits similar effects to those by the above embodiments.

Seventh Embodiment

Figure 18:
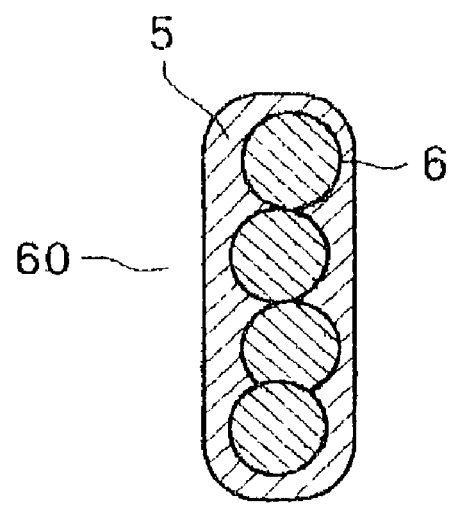
FIG. 18 is a sectional view of a magnetic particle comprised of a coexisting ferromagnetic phase and antiferromagnetic phase according to a seventh embodiment of the present invention.

In the present embodiment, as a magnetic particle comprising a coexisting ferromagnetic phase and antiferromagnetic phase, as shown in FIG. 18, a composite particle 60 comprised of ferromagnetic inclusions 6 surrounded by an antiferromagnetic matrix 5 is formed.

As mentioned above, in order to utilize this for a high density magnetic recording medium, the size of one composite particle coupled by the magnetic coupling is preferably several tens of nm.

In the magnetic particle 60 having the structure described above, there is an optimum combination of volumes of the ferromagnetic inclusions 6 and the antiferromagnetic matrix 5 in order to obtain the maximum coercive force. Namely, in the composite magnetic particle 60, the ratio between the volume of the ferromagnetic inclusions 6 and the volume of the antiferromagnetic matrix 5 is a range where no exchange biasing field appears and the rotational hysteresis loss is made the maximum.

In the present embodiment as well, the materials of the ferromagnetic inclusions 6 and the antiferromagnetic matrix 5 are selected and the sizes are determined so as to achieve a high coercive force and a good corrosion resistance and thermal stability.

The present embodiment exhibits similar effects to those by the above embodiments.

Eighth Embodiment

Figure 19:
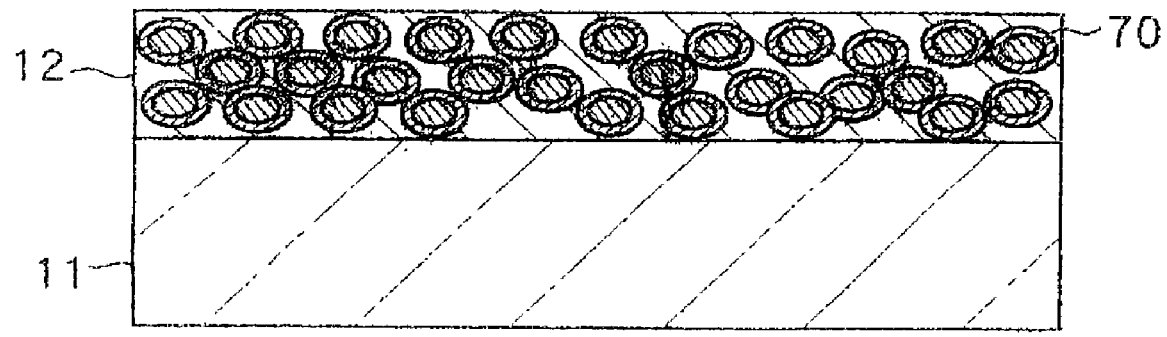
FIG. 19 is a sectional view of a magnetic recording medium using a magnetic material comprised of a coexisting ferromagnetic phase and antiferromagnetic phase according to an eighth embodiment of the present invention.

As shown in FIG. 19, magnetic particles 70 comprised of magnetic particles 10, 20, 30, 40, 50, or 60 of the present invention mentioned above may be filled in a layer region on a substrate 11 of a hard or flexible non-magnetic material by coating or another method to form a magnetic filled layer 12 and thereby achieve a magnetic recording medium suitable for high density recording and excellent in thermal stability.

In FIG. 19, the thickness of the magnetic filling layer 12 is for example 0.5 µm.

In each magnetic material 70, the ratio of volumes of the ferromagnetic phase and the antiferromagnetic phase is determined by the principle that the rotational hysteresis loss be made the maximum and no exchange biasing field appears.

In the case of the magnetic materials 10, 20, and 30 of the core-shell structure, when the core is formed by a high coercive force alloy, a magnetic metal layer having a high spin density containing for example Fe, Co, or Ni as its main ingredients is formed between the high coercive force alloy core and the antiferromagnetic shell.

The materials of the ferromagnetic material and the antiferromagnetic material are selected as mentioned in the first embodiment.

The present invention is not limited to the embodiments explained above. Various modifications are possible in a range not out of the gist of the present invention.

For example, the materials of the ferromagnetic phase material and the antiferromagnetic phase material, the mode of providing a coexisting ferromagnetic phase and antiferromagnetic phase, and the shape, size, etc. of the magnetic material of the core-shell structure are not particularly limited so far as the effects of the present invention are obtained.

Summarizing the effects of the present invention, according to the present invention, by surrounding a material having a ferromagnetic phase at ordinary temperature by a shell of a material having an antiferromagnetic phase at ordinary temperature, the thermal fluctuaction is suppressed and a higher coercive force is obtained while satisfying the requirement for increased fineness of the magnetic material.

Since the ferromagnetic phases of different particles are isolated by the antiferromagnetic phase shells and do not contact each other, a good dispersion state of the magnetic particles can be held when preparing a magnetic coating. By providing a shell of a material having an antiferromagnetic phase at ordinary temperature, a high coercive force is obtained in a very wide temperature range and the thermal stability is excellent.

By providing a shell of an antiferromagnetic phase, the particle size suitable for obtaining the best effect of the present invention is small. This is advantageous for increased fineness of the magnetic particles.

Due to the above, a magnetic material and magnetic recording medium able to cope with a further higher recording density can be realized.

While the invention has been described with reference to specific embodiments chosen for purpose of illustration, it should be apparent that numerous modifications could be made thereto by those skilled in the art without departing from the basic concept and scope of the invention.

What is claimed is:

1. A magnetic material comprising a core formed by a material having a ferromagnetic phase at a temperature of 300 K or higher and a shell formed by surrounding a periphery of the core with a material having an antiferromagnetic phase at a temperature 300 K or higher, and
wherein a ratio between a volume of said ferromagnetic phase material and a volume of said antiferromagnetic phase material is in a range where substantially no exchange biasing field appears in said magnetic material and a rotational hysteresis loss becomes a maximum or less than but substantially close to said maximum.

2. A magnetic material as set forth in claim 1, wherein said ferromagnetic phase material comprises at least Fe, Co, or an alloy having Fe or Co as an ingredient.

3. A magnetic material as set forth in claim 1, wherein said ferromagnetic phase material includes an alloy including at least Pr, Cr, or an Fe oxide-based magnetic material.

4. A magnetic material as set forth in claim 3, further having a ferromagnetic metal layer comprised of at least one of Fe, Co, and Ni formed between said ferromagnetic core and said antiferromagnetic shell.

5. A magnetic material as set forth in claim 1, wherein said antiferromagnetic phase material includes at least an oxide of one of Ni, Co, Fe, and Cr, or a fluoride of an alloy of one of Fe, Mn, and Ni with K.

6. A magnetic material as set forth in claim 1, wherein said antiferromagnetic phase material comprises an alloy including at least Mn or Cr.

7. A magnetic material as set forth in claim 1, wherein the material forming said ferromagnetic core includes a hexagonal closest packed structure as a main component of its crystalline structure.

8. A magnetic material comprising a core formed by a material having a ferromagnetic phase at a temperature of 300 K or higher and a shell formed by surrounding a periphery of the core with a material having an antiferromagnetic phase at a temperature of 300 K or higher; and
wherein a ratio between a volume of said ferromagnetic phase material and a volume of said antiferromagnetic phase material is in a range where substantially no exchange biasing field appears in said magnetic material and a rotational hysteresis loss becomes a maximum or less than but substantially close to said maximum; and
wherein said ferromagnetic phase material comprises at least Fe, Co, or an alloy having Fe or Co as an ingredient; and
wherein said antiferromagnetic phase material includes at least an oxide of one of Ni, Co, Fe, and Cr, or a fluoride of an alloy of one of Fe, Mn, and Ni with K.

* * * * *